United States Patent [19]

Baba

[11] Patent Number: 4,647,159

[45] Date of Patent: Mar. 3, 1987

[54] GRADIENT INDEX TYPE SINGLE LENS

[75] Inventor: Takeshi Baba, Yokohama, Japan

[73] Assignee: Canon Kabushiki Kaisha, Tokyo, Japan

[21] Appl. No.: 686,153

[22] Filed: Dec. 26, 1984

[51] Int. Cl.$^4$ ................................................ G02B 3/00
[52] U.S. Cl. .................................................... 350/413
[58] Field of Search ......................................... 350/413

[56] References Cited

FOREIGN PATENT DOCUMENTS 0006354 1/1980 Japan ................................... 350/413

OTHER PUBLICATIONS

Nishi et al., "Selfoc Microlens with a Spherical Surface," *Applied Optics*, vol. 21, No. 6, Mar. 15, 1982, pp. 1021-1023.

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

In a gradient index type single lens having a gradient index in a direction perpendicular to the optic axis thereof, the surface of the single lens on the light beam incidence side when the single lens is used at a reduced magnification forms a planar surface, the surface of the single lens on the light beam emergence side forms a convex surface and are satisfied the following conditions:

$$0.55 \leq (1-N_0) \cdot f/r_2 \leq 1.20$$

$$0.8 \leq d/f \leq 2.2$$

where $r_2$ is the radius of curvature of the surface on said light beam emergence side, d is the thickness of the single lens, $N_0$ is the on-axis refractive index of the single lens, and f is the focal length of the single lens.

2 Claims, 8 Drawing Figures

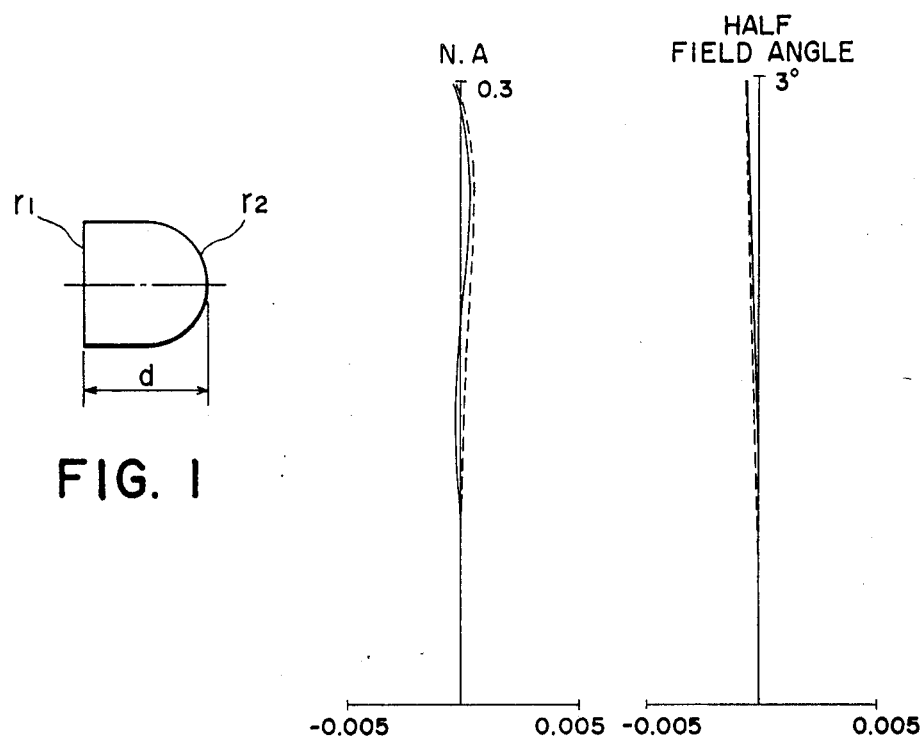
FIG. 1
FIG. 2A    FIG. 2B
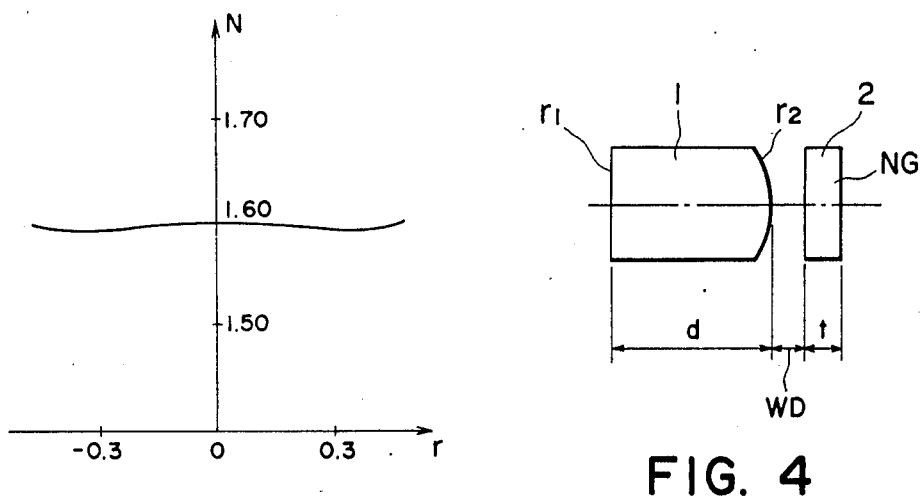
FIG. 3
FIG. 4

GRADIENT INDEX TYPE SINGLE LENS

BACKGROUND OF THE INVENTION

1. Field of the Invention

This invention relates to a gradient index type single lens suitable as the collimator lens of a semiconductor laser or the pickup objective lens or the like of an optical disc.

2. Description of the Prior Art

SELFOC lens (trade name) is well known as a lens having an index gradient in a direction perpendicular to the optic axis thereof, i.e., so-called radial gradient index lens, and has been used as an erect one-to-one magnification imaging element in a copying apparatus or the like.

In recent years, attempts have been made to use this gradient index type lens as the pickup objective lens of a digital audio disc or the like. The use of a plano-convex gradient index type lens is shown in the 4th topical meeting on gradient-index optical imaging systems. However, in the single lens shown therein, only the correction of spherical aberration which is an on-axis aberration is considered. In contrast, where such lens is actually used as a pickup objective lens or a collimator lens, not only the on-axis aberration but also off-axis aberration must be well corrected.

SUMMARY OF THE INVENTION

In view of the above-noted points it is an object of the present invention to provide an gradient index type single lens in which spherical aberration and sine condition are well corrected.

The single lens according to the present invention is plano-convex in shape and, when this single lens is used at a reduced magnification, the surface thereof on the light beam incidence side forms a planar surface and the surface thereof on the light beam emergence side forms a convex surface relative to the image side (the light beam emergence side), and the above object is achieved by the single lens satisfying the following conditions:

$$0.55 \leq (1-N_0)f/r_2 \leq 1.20$$

$$0.8 \leq d/f \leq 2.2$$

where $r_2$ is the radius of curvature of said convex surface, d is the thickness of the single lens, $N_0$ is the on-axis refractive index of the single lens, and f is the focal length of the single lens. Accordingly, where the single lens according to the present invention is used as a light pickup objective lens, the convex surface thereof faces a recording medium, and where and where the single lens is used as the collimator lens of a semiconductor laser, the convex surface thereof faces the semiconductor laser.

Further, the single lens according to the present invention satisfies the condition that $$0.45 \leq |r_2/d| \leq 0.58,$$

thereby enabling better correction of aberrations.

In the single lens according to the present invention, installing the lens in the manner as described above when it is used at a reduced imaging magnification means that a parallel light beam or a light beam approximate to a parallel light beam enters or emerges from the planar surface of the lens.

BRIEF DESCRIPTION OF THE DRAWINGS

FIG. 1 shows the shape of a single lens according to the present invention.

FIGS. 2A and 2B show the aberrations of an embodiment of the single lens according to the present invention.

FIG. 3 shows the gradient index of an embodiment of the single lens according to the present invention.

FIG. 4 is a schematic view showing the single lens according to the present invention when used as the pickup lens of an optical disc.

DESCRIPTION OF THE PREFERRED EMBODIMENTS

Figures 5A, 5B:
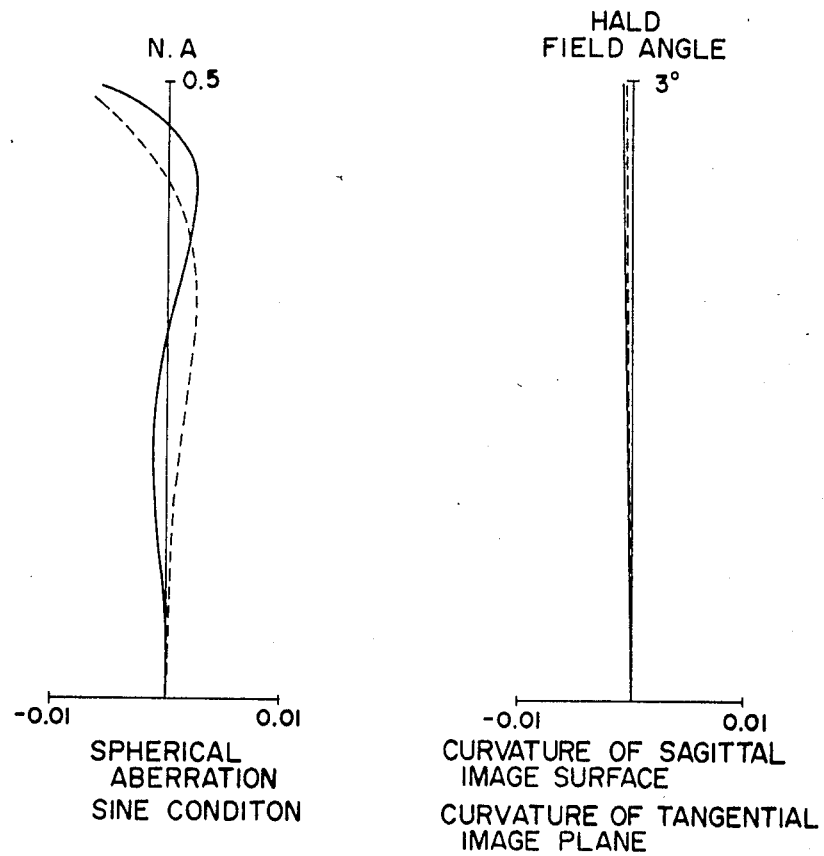
FIGS. 5A and 5B show the aberrations of an embodiment of the single lens shown in FIG. 4.

To correct spherical aberration and sine condition, it is necessary to make the values of tertiary or third-order spherical aberration coefficient and coma coefficient small.

In a radial gradient single lens wherein the refractive index N is expressed as follows relative to the distance r from the optic axis:

$$N(r) = N_0 + N_1 r^2 + N_2 r^4 + N_3 r^6 + N_4 r^8 + \ldots \quad (1)$$

($N_0$, $N_1$, $N_2$, $N_3$, $N_4$ ... constant),
parameters which contribute to the value of the tertiary aberration coefficient are $N_0$, $N_1$, $N_2$ and $r_1$: radius of curvature of the first surface
$r_2$: radius of curvature of the second surface
d: thickness.

Of these, the on-axis refractive index $N_0$ can assume only a value of the order of 1.4–1.8 and therefore, if $N_0$ is regarded as $N_0 \approx 1.6$, parameters which contribute to the tertiary aberration coefficient are considered to be $r_1$, $r_2$, d, $N_1$ and $N_2$.

On the other hand, the required conditions are the following three:

$$\left. \begin{array}{ll} \text{tertiary spherical aberration coefficient} & I \approx 0 \\ \text{tertiary coma coefficient} & II \approx 0 \\ \text{focal length} & f = \text{constant} \end{array} \right\} \quad (2)$$

and therefore, even if $r_1$ is limited to $r_1 = \infty$ from the fact that one surface is a plane, it is anticipated that there are many solutions of $r_2$, d, $N_1$ and $N_2$ which satisfy condition (2). From among these many solutions, ones capable of correcting high-order aberrations or ones in which the working distance is appropriate can be selected in accordance with the conditions of use.

Among $r_2$, d, $N_1$ and $N_2$, those which contribute to the paraxial amount are $r_2$, d and $N_1$ and, as shown in P. J. Sands: Jour. Opt. Soc. Am., 60, pages 1436–1442 (1970), $N_2$ is in a linear relation with the tertiary aberration coefficients. Accordingly, d, $N_1$, and $N_2$ which satisfy condition (2) for a certain $r_2$ can be found by the following procedures:

(1) d is given arbitrarily;
(2) $N_1$ is found so that f=constant;
(3) $N_2$ is found so that I=0; and
(4) The procedures (1)–(3) are repeated with so that d varied II=0.

After the initial values of the parameters $r_2$, d, $N_1$ and $N_2$ have been determined by such procedures, each parameter may be varied as in the case of the conventional lens design to thereby balance each aberration.

Also, by introducing the high-order coefficients $N_3$, $N_4$, ... of the gradient index, it is possible to correct spherical aberration better and achieve a great aperture.

The following facts have become apparent from the above-described designing process.

First, for the correction of spherical aberration and sine condition, it is desirable that $r_2$ and d satisfy the following conditions:

$$0.55 \leq (1-N_0)\cdot f/r_2 \leq 1.20 \quad (3-1)$$

$$0.8 \leq d/f \leq 2.2 \quad (3-2)$$

$(1-N_0)f/r_2$ indicates the value of the refractive power borne by the second surface relative to the refractive power of the entire system, and if this value exceeds the upper limit of condition (3-1), correction of spherical aberration will become difficult, and if this value exceeds the lower limit of condition (3-1), the effect of coma correction by the second surface will not be obtained.

Also, if d exceeds the lower limit of condition (3-2), the absolute value of $N_1$ will increase in order to keep the focal length constant and thus, manufacture will become difficult and spherical aberration will be aggravated. If d exceeds the upper limit of condition (3-2), the working distance will decrease.

For better correction of spherical aberration and sine condition, it is desirable that the following condition be further satisfied:

$$0.45 \leq |r_2/d| \leq 0.58 \quad (3-3)$$

That is, when $|r_2|$ increases and the refractive power by the second surface decreases, the refractive power which the gradient index has must be increased in order to keep the focal length constant, but by increasing d with the relation of condition (3-3) and suppressing the increase in gradient index, spherical aberration and sine condition can be corrected well.

Embodiments of the present invention will hereinafter be described. Table 1 below shows the lens data of first to sixth embodiments of the single lens according to the present invention, and as shown in FIG. 1, $r_1$ is the radius of curvature of the planar surface, $r_2$ is the radius of curvature of the convex surface, and d is the thickness of the lens. The radius of curvature $r_1$ of the planar surface is infinite $N_0$, $N_1$, $N_2$, $N_3$ and $N_4$, as shown in equation (1), are constants which determine the gradient index of the single lens. Also, the lens data shown are the values when the focal length is normalized to 1.

In the present invention, the light beam incidence side of the single lens in a case where a light beam travels from the planar surface toward the convex surface of the single lens when used at a reduced magnification as shown in FIG. 1 is defined as the object side, and the light beam emergence side of the single lens is defined as the image side and accordingly, the value of the radii of curvature of the surfaces are positive in a case where the center of curvature lies more adjacent to the image side than to the surfaces, and are negative in the converse case.

TABLE 1

| Embodiment | $r_2$ | d | $N_0$ | $N_1$ | $N_2$ | $N_3$ | $N_4$ |
|---|---|---|---|---|---|---|---|
| 1 | −0.5556 | 1.133 | 1.6 | 0.0561 | 0.9960 | 0. | 0. |
| 2 | −0.6479 | 1.286 | 1.6 | −0.0593 | 0.5197 | 1.9460 | 0. |
| 3 | −0.7789 | 1.577 | 1.6 | −0.0932 | 0.2555 | 0.4958 | 0. |
| 4 | −0.9578 | 1.895 | 1.6 | −0.1767 | 0.1318 | 0.0597 | 0.3408 |
| 5 | −0.6241 | 1.307 | 1.45 | −0.1587 | 0.3440 | 1.1134 | 0. |
| 6 | −0.8380 | 1.676 | 1.75 | −0.0574 | 0.2897 | 0.5570 | 0. |

Table 2 below shows the values of the back focus $S'_k$, tertiary spherical aberration coefficient I, coma coefficient II, astigmatism coefficient III, Petzval sum P, distortion coefficient V, $|r_2/d|$ and $(1-N_0)/r_2$ of the respective embodiments (No. 1–No. 6) shown in Table 1 when the object is at infinity.

TABLE 2

| Embodiment | $S'_k$ | I | II | III | P | V | $|r_2/d|$ | $(1-N_0)/r_2$ |
|---|---|---|---|---|---|---|---|---|
| 1 | 1.05 | 0.001 | 0.116 | −0.469 | 0.625 | 0.875 | 0.49 | 1.080 |
| 2 | 0.92 | 0.267 | −0.164 | −0.187 | 0.626 | 0.619 | 0.50 | 0.926 |
| 3 | 0.91 | 0.063 | −0.071 | −0.198 | 0.633 | 0.586 | 0.49 | 0.770 |
| 4 | 0.64 | −0.022 | −0.053 | −0.095 | 0.667 | 0.353 | 0.51 | 0.626 |
| 5 | 0.84 | 0.162 | −0.163 | −0.118 | 0.709 | 0.380 | 0.48 | 0.721 |
| 6 | 0.91 | 0.083 | −0.045 | −0.259 | 0.574 | 0.757 | 0.50 | 0.895 |

FIGS. 2A and 2B show the aberrations of the third embodiment (No. 3). In FIG. 2A, solid line indicates spherical aberration and broken line indicates sine condition, and in FIG. 2B, solid line indicates the curvature of sagittal image plane and broken line indicates the curvature of tangential image plane. FIG. 3 shows the gradient index N(r) of the lens shown in the third embodiment in the direction orthogonal to the optic axis thereof. In FIG. 3, the ordinate represents the refractive index N and the abscissa represents the distance from the optic axis (r=0).

The fourth embodiment (No. 4) has a great aperture in which particularly NA is of the order of 0.5, and is usable as the pickup objective lens or the like of an optical disc.

As shown in FIGS. 2A and 2B, the various aberrations are well corrected, and the aberrations of the other lenses are such that NA is 0.2–0.3 and the half field angle is of the order of 3°, which means a good performance.

In any of these first to sixth embodiments, as seen from Table 2, tertiary spherical aberration coefficient and coma coefficient are well corrected and in making the aperture of the lens great, high-order spherical aberrations may be corrected by the control of the coefficient of high-order gradient index.

Also, in the shown embodiments, correction of spherical aberration is accomplished by the coefficients $N_2$, $N_3$, ... of gradient index but a similar effect may also be obtained by introducing a non-spherical surface into the second surface.

This is because for the tertiary spherical aberration coefficient created by the index gradient, $N_2$ contributes in the form of $N_2 \times \int h^3(x)dx$ and for the tertiary coma coefficient, $N_2$ contributes in the form of $N_2 \times \int h^2(x)\bar{h}(x)dx$, where $h(x)$ is the height of the paraxial on-axis light ray at a point in a heterogeneous medium and $\bar{h}(x)$ is the height of the paraxial principal light ray, and integration is effected in the direction of the optic axis of the heterogeneous medium. Accordingly, these integrated values are determined by only $r_1$, $r_2$, d, $N_0$, $N_1$, the object and the position of the entrance pupil, but if the entrance pupil lies near the lens and the lens is not so long, $\bar{h}(x)$ will become a value considerably smaller than $h(x)$ and $N_2$ will hardly affect the coma coefficient. That is, the value of the coma coefficient is determined by only $r_1$, $r_2$, d, $N_0$, $N_1$ and the object distance.

It is easy to obtain the correction effect of spherical aberration by $N_2$ by the fourth-order non-spherical coefficient of the second surface, but again in this case, the fourth-order non-spherical coefficient does not contribute to the coma coefficient. In the stage in which spherical aberration has been corrected, the coma coefficient has nothing to do with the position of the enterance pupil and therefore, if the entrance pupil lies on the second surface, the contribution of the fourth-order non-spherical coefficient to the coma coefficient will be 0.

Such a circumstance also basically holds true with respect to high-order aberration and therefore, the coefficients $N_2$, $N_3$, . . . of the gradient index are nearly equivalent to the fourth-order, the sixth-order . . . non-spherical coefficients in the correction of aberrations.

FIG. 4 is a partial schematic view showing a case where the single lens of the present invention is applied as the pickup objective lens of an optical disc. In FIG. 4, reference numeral 1 designates the single lens of the present invention, and reference numeral 2 denotes the glass plate of an optical disc. t represents the thickness of the glass plate, $N_G$ represents the refractive index of the glass plate, and WD represents the air space between the single lens and the glass plate.

A parallel flat plate glass so disposed rearwardly of the optical system has the function of correcting spherical aberration to the positive, as is well known, and particularly the tertiary spherical aberration coefficient is increased by $$-\frac{1}{N_G}\left(1 - \frac{1}{N_G^2}\right) t/f$$

by the parallel flat plate glass. (f is the focal length of the entire system.) Accordingly, during the designing of the aforedescribed single lens, it is necessary to make the spherical aberration of the single lens under-corrected by this amount, and it is desirable that $|r_2/d|$ assume a value somewhat greater than that in the aforedescribed first to sixth embodiments.

Table 3 below shows two examples (seventh and eighth embodiments) of the lens data of the single lens 1 when t=1.2 and $N_G$=1.52 and WD=0.87.

TABLE 3

| Embodiment | $r_2$ | d | $N_0$ | $N_1$ | $N_2$ | $N_3$ | $N_4$ |
|---|---|---|---|---|---|---|---|
| 7 | −2.8811 | 5.242 | 1.651 | −2.695 × $10^{-2}$ | 1.847 × $10^{-3}$ | 2.900 × $10^{-5}$ | 3.700 × $10^{-6}$ |
| 8 | −3.3240 | 5.985 | 1.651 | −2.191 × $10^{-2}$ | 1.134 × $10^{-3}$ | 7.113 × $10^{-5}$ | 1.614 × $10^{-5}$ |

Table 4 below shows the values of the then focal length f, the air conversion back focus $S'_K$ of the single lens, the tertiary aberration coefficients of the entire system and $|r_2/d|(1-N_0)f/r_2$.

TABLE 4

| Embodiment | f | $S'_K$ | I | II | III | P | V | $|r_2/d|$ | $(1-N_0)f/r_2$ |
|---|---|---|---|---|---|---|---|---|---|
| 7 | 2.67 | 1.66 | 0.039 | −0.058 | −0.082 | 0.643 | 0.373 | 0.55 | 0.603 |
| 8 | 3.01 | 1.59 | 0.004 | −0.050 | −0.070 | 0.647 | 0.341 | 0.56 | 0.590 |

In the present specification, the gradient index has been represented as shown in equation (1), but it is often the case that the gradient index is represented by an equation like $N(r)^2 = N_0^2\{1-(gr)^2+h_4(gr)^4+h_6(gr)^6+ . . .\}$ and therefore, the values of parameters $N_0$, g, $h_4$ and $h_6$ when the gradient index of the seventh and eighth embodiments are so represented will be given in Table 5 below.

TABLE 5

| Embodiment | $N_0$ | g | $h_4$ | $h_6$ |
|---|---|---|---|---|
| 7 | 1.651 | 0.1807 | 2.349 | 9.044 |
| 8 | 1.651 | 0.1629 | 2.200 | 3.632 |

FIGS. 5A and 5B show the aberrations of the single lens shown in the seventh embodiment. The solid line and broken line in FIG. 5A are the same as those in FIG. 2A, and the solid line and broken line in FIG. 5B are the same as those in FIG. 2B.

The application of such single lens according to the present invention can be easily achieved simply by selecting an embodiment having an appropriate back focus from Table 1 and correcting the aggravation of spherical aberration by the glass plate 2.

The aberration coefficients in Table 2 and 4 and the aberration graphs of FIGS. 2 and 5 are all the values in the state in which the object is at infinity and the entrance pupil is coincident with the forward principal point position.

Also, in the present invention, it is desirable in the correction of high-order spherical aberrations that as shown in FIG. 3, the single lens have a very weak negative or positive index gradient near the optic axis of the lens. Such a gradient index can be formed by the optical copolymerizing method which is to be found in Y. Koike and Y. Ohtsuka: Applied Optics, 22, pages 418–423 (1983).

Also, in the ion exchange method, it is possible by causing ions having the effect of increasing the refractive index by a short time of ion exchange, for example, $T1^+$, $Cs^+$ or the like, to be distributed in the marginal portion of the lens.

As described above, in the present invention, one end surface is planar and yet has a good performance, and this leads not only to remarkable ease of the working and inspection of the lens but also to remarkable simplification of the structure of the lens barrel.

For example, in the case of the pickup objective lens of the optical disc described in connection with FIG. 4, an auto-focus mechanism and an auto-tracking mechanism are usually required in order to cope with the surface vibration and eccentricity of the optical disc. Therefore, use is made of a method of mounting an objective lens on an electromagnetically driven movable element called an actuator and moving the objective lens in the direction of the optic axis and in a direction orthogonal to the optic axis.

In such a case, to enhance the responsiveness of the drive, it is required to reduce the weight of the objective lens itself and of the lens barrel supporting the lens.

In the present invention, the objective lens is a single lens which is light in weight, and the first surface of the objective lens is planar and therefore, the lens barrel and the mechanism for mounting the lens on the actuator are remarkably simplified.

Figure 6:
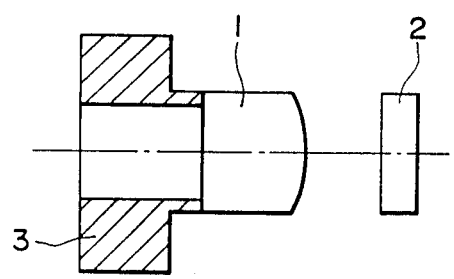
FIG. 6 shows an example of the lens support when the single lens according to the present invention is used as the pickup lens of an optical disc.

FIG. 6 shows an example of the manner in which the pickup objective lens of the optical disc in the present invention is mounted on the actuator.

Reference numeral 1 designates the single lens in the present invention, and reference numeral 3 schematically denotes the movable portion of the actuator. The first surface which is the planar surface of the single lens 1 may simply be adhesively connected to the end surface of the movable portion.

Thus, in the single lens of the present invention, the first surface thereof is a planar surface, whereby the working of the lens itself is remarkably easy and the structure of the lens barrel supporting the lens is remarkably simplified and made light in weight.

Also, even in a case where the lens is used with a prism or the like being disposed forwardly of the lens, by using the single lens of the present invention with its end surface being adhesively secured to the surface of the prism, the structure of the lens barrel can be simplified and in addition, surface reflection can be reduced.

In the foregoing, a case where the object point exists at infinity relative to the planar surface has been shown as an embodiment used as a reduced magnification, but even if the object point lies at a finite distance from the planar surface, the performance of the single lens will be good if it is used at a reduced magnification.

In the present invention, spherical aberration and sine condition are corrected by the single lens, but such a single lens is also effectively usable as element of a combination lens.

As described above, according to the gradient index type single lens of the present invention, correction of spherical aberration and sine condition is possible, and such single lens is usable as a collimator lens or the pickup objective lens of an optical disc.

I claim:

1. A gradient index type single lens having an gradient index in a direction perpendicular to the optic axis thereof, wherein the surface of said single lens on the light beam incidence side when said single lens is used at a reduced magnification forms a planar surface and the surface of said single lens on the light beam emergence side forms a convex surface, said single lens satisfying the following conditions:

$$0.55 \leq (1-N_0) \cdot f/r_2 \leq 1.20$$

$$0.8 \leq d/f \leq 2.2$$

where $r_2$ is the radius of curvature of the surface on said light beam emergence side, d is the thickness of said single lens, $N_0$ is the on-axis refractive index of said single lens, and f is the focal length of said single lens.

2. A gradient index type single lens according to claim 1, wherein said d and said $r_2$ satisfy the relation that $$0.45 \leq |r_2/d| \leq 0.58.$$

* * * * *